United States Patent [19]

Gallagher

[11] Patent Number: 5,396,296
[45] Date of Patent: Mar. 7, 1995

[54] VIDEO FEEDBACK MATCHING CIRCUIT AND METHOD THEREFOR

[75] Inventor: Mary E. Gallagher, Mesa, Ariz.

[73] Assignee: Motorola, Inc., Schaumburg, Ill.

[21] Appl. No.: 148,455

[22] Filed: Nov. 8, 1993

[51] Int. Cl.[6] .............................................. H04N 5/45
[52] U.S. Cl. ..................................... 348/565; 348/566
[58] Field of Search ................................ 348/564–568

[56] References Cited

U.S. PATENT DOCUMENTS

| 4,682,234 | 7/1987 | Naimpally | 348/565 |
| 4,821,086 | 4/1989 | McNeely et al. | 348/566 |
| 4,855,812 | 8/1989 | Rokuda et al. | 348/566 |
| 4,992,874 | 2/1991 | Willis et al. | 348/565 |

*Primary Examiner*—Victor R. Kostak
*Attorney, Agent, or Firm*—Gary Hoshizaki

[57] ABSTRACT

A circuit (10) for inserting a secondary video signal in a primary video signal. The primary and secondary video signals are combined forming a combined video signal having a primary video portion and a secondary video portion. The combined video signal is fed back to a feedback matching circuit (21) for measuring and comparing the phase, amplitude, and blanking level of a reference signal of the primary video portion and a reference signal of the secondary video portion of the combined video signal. The feedback matching circuit (21) makes an adjustment to the secondary video signal to reduce differences between the reference signals of the primary and secondary video portions of the combined video signal.

18 Claims, 2 Drawing Sheets

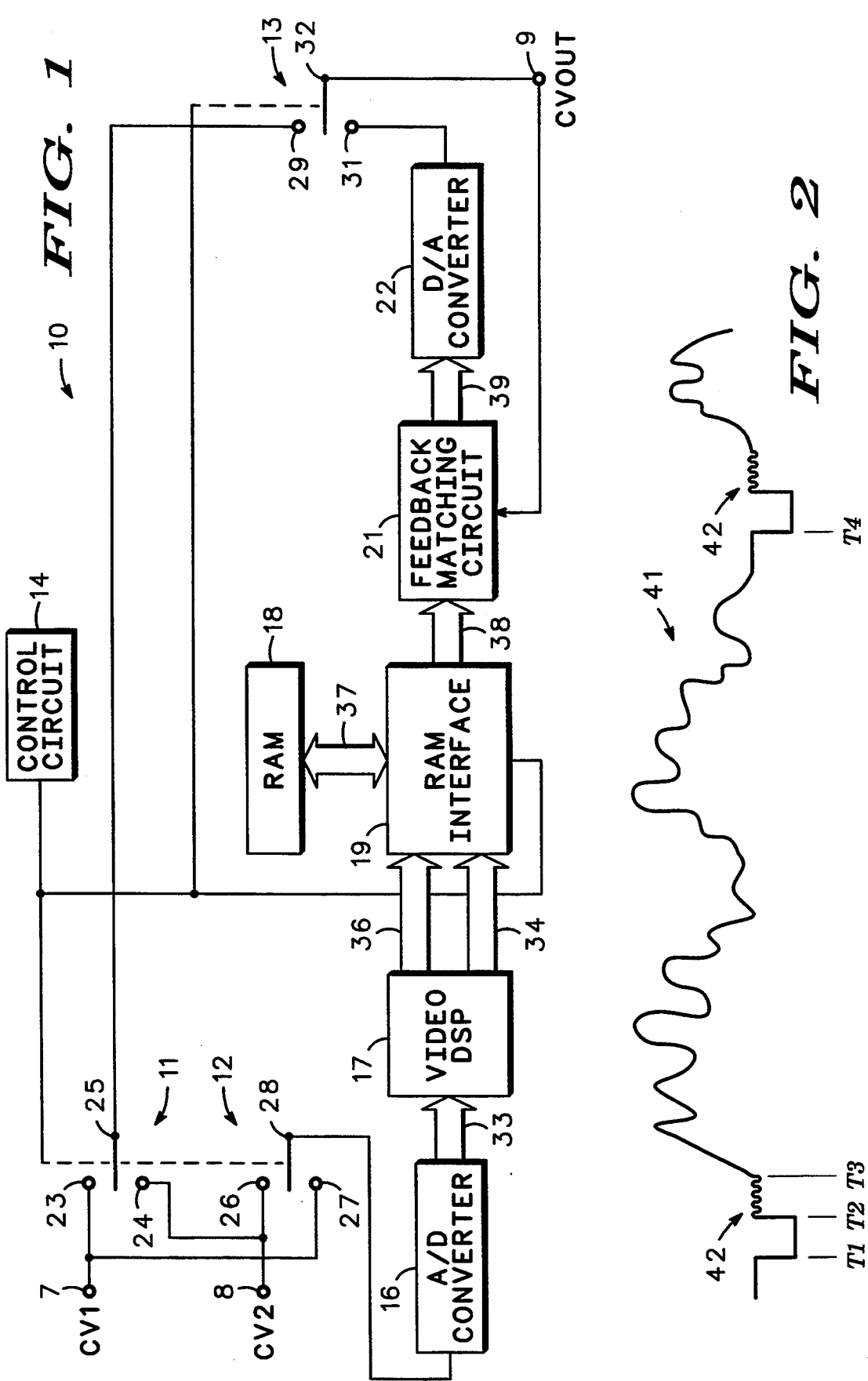

VIDEO FEEDBACK MATCHING CIRCUIT AND METHOD THEREFOR

BACKGROUND OF THE INVENTION

The present invention relates, in general, to television systems and, more particularly to, a picture-in-picture processing circuit for a television system.

A picture-in-picture (PIP) feature in televisions allows the viewer to see two or more channels simultaneously on the screen. The viewer selects a main primary channel to cover the majority of the screen and alternate channels which are inserted in small portions of the screen. The viewer may thus keep track of several channels at the same time.

The television typically includes a main signal processing path for the incoming video of the primary channel. To generate the PIP images, the other video channels are converted to a digital format and stored in RAM. The data for the PIP images is averaged or compressed to fit in a smaller area of the television screen. Once a complete image of the alternate channel is stored, it is off loaded from the RAM to a digital-to-analog converter. At the appropriate point in the horizontal sweep, a controller switches from the primary channel to the PIP-constructed secondary channel to insert the PIP image. The controller then switches back to the primary channel. The result is reduced size PIP images of the alternate channels inserted in small areas of the television screen with the primary channel filling the remaining areas of the screen.

A video signal contains different types of information which is processed by the receiver section of the television. Luminance and chroma information reside in the video signal. The luma data is amplitude modulated, where the higher amplitudes are white and lower amplitudes are black. The chroma data is superimposed as a 3.58 MHz sub-carrier on the luma signal. The chroma signal contains two chrominance components B-Y and R-Y modulated in quadrature on the sub-carrier. The amplitude and phase of the demodulated chroma signal relative to a 3.58 MHz reference burst introduced at the beginning of each horizontal scan determines the saturation and hue respectively.

The chroma components of the secondary channel are stored in RAM at a normalized level. To assure proper color rendition of the reconstructed secondary signal, the reconstruction must be done with reference to the phase and amplitude of the primary channel burst signal. Feed forward gain and phase control is one approach that has been used, but has performance limitations. Using feed forward usually requires factory adjustments to trim out error. For example, in prior art systems, the hue is matched by burst locking the reconstruction circuits to the primary channel burst; due to uncertain phase delays through this circuit, a factory adjustment is required. These uncertain phase delays take place at several points; static phase error in the phase detector, phase shifts in filters and amplifiers processing the signal, and propagation delays and rise times from the clock input to the D/A Converter output. For saturation or amplitude control, the primary burst amplitude is detected to produce a DC control signal proportional to the burst amplitude. This control signal then either modifies the level of the color difference signals going to the A/D Converter and on to the RAM, or modifies the gain of a D/A Converter reconstructing the chroma signal. Errors occur in this signal processing due to nonlinearity and sensitivity of the level detector and control mechanism. Trim adjustments are subject to initial setting errors as well as drift. Blanking level errors can occur due to clamping the primary and reconstructed secondary video to different levels before combining them together. Blanking errors also occur due to different offsets in amplifiers between the clamping point and the switching point. Furthermore, blanking level match is typically untrimmed. The quality of the blanking level match is typically a function of the circuitry used.

It would be of great benefit if a circuit could be developed which precisely compensated for the differences of two video signals thereby allowing one to be inserted with the other with minimal error. The circuit would eliminate the need for factory trimming and the manufacturing costs associated thereto and compensate for the effects of aging and temperature.

BRIEF DESCRIPTION OF THE DRAWINGS

FIG. 1 is a block diagram of a picture in picture (PIP) processing circuit incorporating a feedback matching circuit in accordance with the present invention;

FIG. 2 is a diagram of a video signal illustrating a horizontal sync pulse and a reference burst.

DETAILED DESCRIPTION OF THE DRAWINGS

Figure 3:
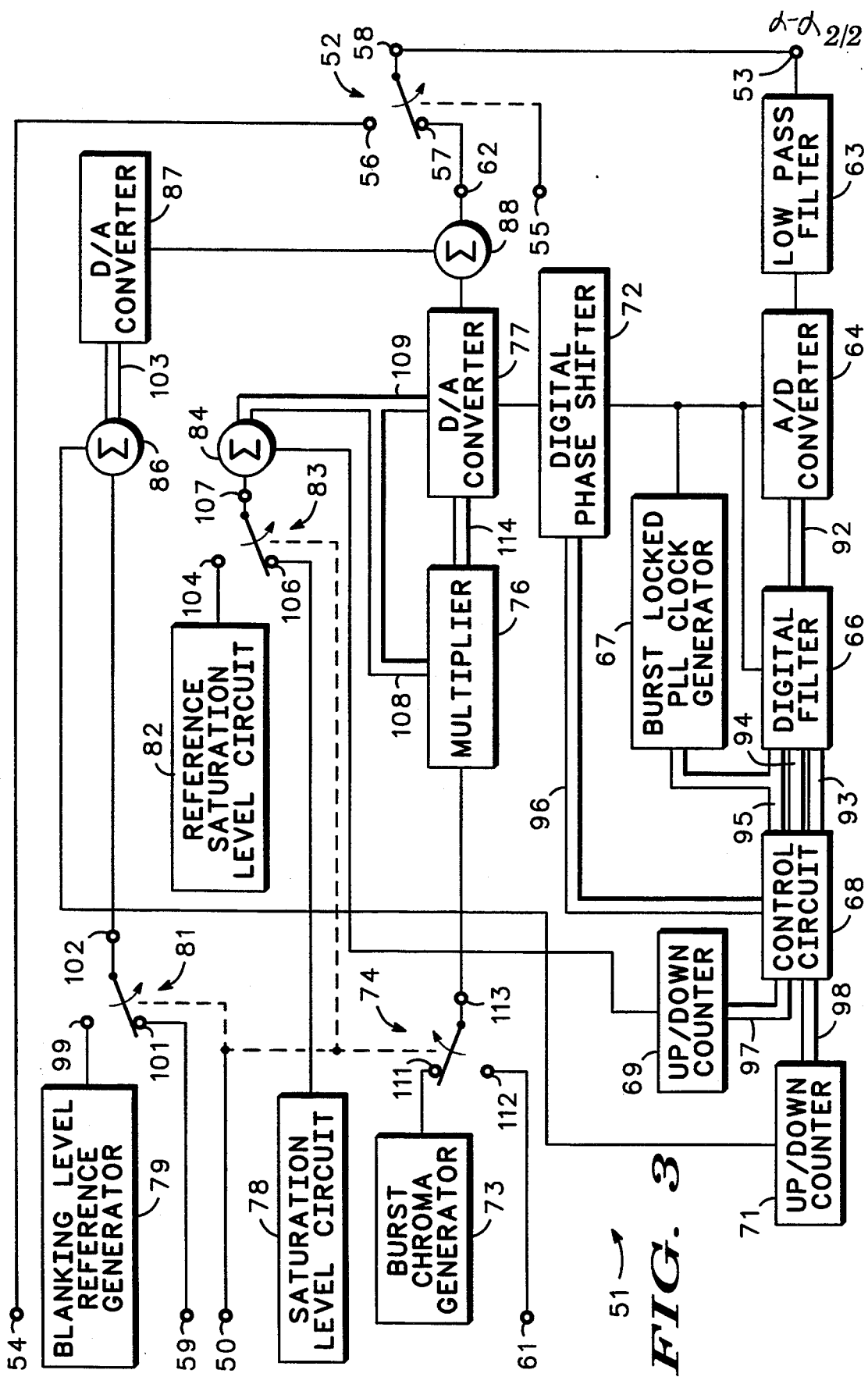
FIG. 3 is a block diagram of a feedback matching circuit.

A block diagram for picture-in-picture (PIP) processing circuit 10 is shown in FIG. 1 suitable for manufacturing as an integrated circuit using conventional integrated circuit processes. PIP processing circuit 10 precisely matches amplitude and phase relative to a reference burst when inserting locally generated chroma signals into an incoming video signal. A single digital measurement is used to alternately measure the incoming and locally generated composite video. In the preferred embodiment, the measurement point is in the final output path after the two signals are combined. Error is reduced by using feedback since the error in the measurement channel is common to both signals.

PIP processing circuit 10 has inputs 7-8, an output 9, and includes switches 11-13, control circuit 14, analog to digital (A/D) converter 16, video DSP 17, random access memory (RAM) 18, RAM interface 19, feedback matching circuit 21, and digital to analog (D/A) converter 22. Video signals CV1 and CV2 are respectively applied to inputs 7 and 8 of PIP processing circuit 10. A video signal CVOUT is provided at output 9 of PIP processing circuit 10.

Switch 11 includes a terminal 23 coupled to input 7, a terminal 24 coupled to input 8, and a switch terminal 25. Switch 12 includes a terminal 26 coupled to input 8, a terminal 27 coupled to input 7, and a switch terminal 28 coupled to an input of A/D converter 16. Switch 13 includes a terminal 29 coupled to the terminal 25 of switch 11, a terminal 31 coupled to an output of D/A converter 22, and a switch terminal 32 coupled to output 9. Control circuit 14 includes an outputs coupled to control inputs of switches 11-13.

A/D converter 16 is coupled to video DSP 17 via a bus 33. Video DSP 17 couples to RAM interface 19 via buses 34 and 36. RAM interface 19 couples to RAM 18 via a bus 37, couples to feedback matching circuit 21 via a bus 38, and includes an input coupled to an output of control circuit 14. Feedback matching circuit 21 couples to D/A converter 22 via a bus 39 and includes an input coupled to output 9.

Operation of PIP processing circuit 10 is described hereinafter. PIP processing circuit 10 receives two analog composite video signals (CV1 and CV2). From these a selection is made where one of either CV1 or CV2 is chosen as a primary video signal and the other as an alternate video signal. This is determined by switches 11 and 12. The primary video signal (either CV1 or CV2) is coupled to terminal 29 while the alternate video signal is coupled to A/D converter 16. Switch 13 switches between the primary video signal and the secondary video signal forming the picture in picture. A combined video signal (CVOUT) is received at output 9 which comprises a primary video portion and a secondary video portion. The secondary video signal is synchronized to and inserted into the primary video signal. In the PIP system, the secondary video signal is processed and the image reduced in size before the insertion is made. In other systems a portion of the secondary video signal may be inserted as a full-size image or the secondary video signal may be computer-generated text and/or graphics that did not originate as an analog video source.

In each case, the secondary video signal needs to be time synchronized both horizontally and vertically to the primary video signal. The secondary video signal includes a chroma signal (hue and saturation) and a luma signal (blanking level) which needs to be matched relative to the corresponding signals of the primary video signal. This is accomplished by feeding back the primary video portion of the combined video signal and measuring/comparing burst and blanking reference information. Adjustments are made by feedback matching circuit 21 to match the secondary video signal relative to the primary video signal.

Referring to FIG. 2. FIG. 2 illustrates a line of a typical composite video waveform. The time between the points marked T1 and T4 is one line time. T1 and T2 show the leading and trailing edges of a horizontal sync pulse which is used in a PIP system for horizontal synchronization of a PIP image with a primary image. The time period T2 to T3 is known as a backporch. The backporch is defined as the time period where burst 42 and blanking reference information is found. Burst 42 consists of 9–13 cycles of a 3.58 MHz sine wave. The amplitude and phase of each burst 42 set a reference for the chroma signal during the active video. The DC level of the backporch is the blanking reference for the luma during the active video.

Referring back to FIG. 1. The PIP processing circuit 10 measures the burst and blanking information for both the primary and secondary video signals at a point where these signals are combined. In FIG. 1, this point is output 9. At output 9, the primary and secondary video portions of the combined video signal have already been transformed by whatever nonlinearities exist in its respective path. In fact, there could be other circuitry or other components (not shown in FIG. 1) in the path between switch terminal 32 and output 9 that increase the nonlinearities.

Measurements at output 9 are used to make adjustments to the secondary video signal to make it match relative to the reference signal of the primary video portion. Measurements at output 9 are made once per field so that corrections will be made periodically. This insures accurate matching as the circuitry and components are exposed to varying conditions and aging. It is important to note that the secondary video signal is precisely matched to the primary signal at a point where they are a combined video signal. Any nonlinearities in the circuitry after this point will affect "both" signals equally and the two images will remain matched.

As mentioned previously, CV1 and CV2 are two analog composite video signals which may be produced by, for example, as TV tuners, VCR tuners, laser discs, and video test generators. Switches 11 and 12 are controlled by control circuit 14. Switch 13 is also under control of control circuit 14. Switch 13 selects either the primary video signal or the secondary video signal (adjusted to match relative to the primary video signal). The secondary video signal is the PIP video signal.

A/D converter 16 converts the alternate video signal into a digital format. In the preferred embodiment, the conversion rate is 14.32 MHz. The entire alternate video signal including sync and burst is digitized. Video DSP 17 filters and processes the alternate video signal to separate it into a luma signal and a chroma signal. In the preferred embodiment, the chroma signal comprises two interleaved chroma components. In the case of the PIP system, the luma signal and the chroma signal are compressed to provide a reduced-size image. Compression is accomplished by subsampling and averaging the data.

The luma and chroma signals are then stored into RAM 18 under the control of RAM interface 19. RAM 18 is used as a time-delay buffer so that the PIP image is synchronized to the primary image. RAM 18 also provides storage for multiple PIP images which can be displayed simultaneously or sequentially. RAM interface 19 controls the timing and selection of the images. RAM interface 19 retrieves the luma and chroma signals stored in RAM 18 and couples them to feedback matching circuit 21.

Feedback matching circuit 21 contains circuit for generating a reference signal with phase, amplitude, and blanking level corresponding to the secondary video signal for comparing with the phase, amplitude, and blanking level of a reference signal of the primary video portion fed back from output 9. Differences between the phase, amplitude, and blanking levels of the primary and secondary video signals generate adjustments within feedback matching circuit 21 to modify the luma and chroma signals to be phase, amplitude, and blanking level matched to the primary video portion. The secondary video signal adjusted to match the primary video signal is inserted via switch 13. Switch 13 switches between the primary video signal and the secondary video signal providing the combined video signal at switch terminal 32 which is coupled to output 9.

FIG. 3 is a block diagram of a feedback matching circuit 51 for matching first and second video signals. Feedback matching circuit 51 includes an input 59, an input 61, and an output 62. A switch 52 is external to feedback matching circuit 51 and includes a terminal 56 coupled to an input 54, a terminal 57 coupled to output 62 of feedback matching circuit 51, and a switch terminal 58 coupled to an output 53. It should be noted that there could be circuitry (not shown) between switch terminal 58 and output 53 that could change the characteristics of a signal coupling there between.

Feedback matching circuit 51 comprises a low pass filter 63, an A/D converter 64, a digital filter 66, a burst locked PLL clock generator 67, a control circuit 68, an up/down counter 69, an up/down counter 71, a digital phase shifter 72, a burst chroma generator 73, a switch 74, a multiplier 76, a D/A converter 77, a saturation level circuit 78, a blanking level reference generator 79, a switch 81, a reference saturation level circuit 82, a switch 83, a summation circuit 84, a summation circuit 86, a D/A converter 87, and a summation circuit 88.

Low pass filter 63 includes an input coupled to output 53 and an output. A/D converter 64 is coupled to digital filter 66 via bus 92 and includes an input coupled to the output of low pass filter 63 and a clock input. Digital filter 66 is coupled to control circuit 68 via buses 93, 94, and 95 and includes a clock input. Control circuit 68 is coupled to digital phase shifter 72, up/down counter 71, and up/down counter 69 via buses 96, 98, and 97 respectively. Digital phase shifter 72 includes a clock input and an output. Burst locked PLL clock generator 67 is coupled to control circuit 68 and digital filter 66 via bus 95 and includes an output coupled to the clock inputs of A/D converter 64, digital filter 66, and digital phase shifter 72. Up/down counters 69 and 71 each include an output.

Switch 81 includes a terminal 99 coupled to an output of blanking level reference generator 79, a terminal 101 coupled to input 59, and a switch terminal 102 coupled to an input of summation circuit 86. Summation circuit 86 includes an input coupled to the output of up/down counter 71 and couples to D/A converter 87 via a bus 103. D/A converter 87 includes an output.

Switch 83 includes a terminal 104 coupled to an output of reference saturation level circuit 82, a terminal 106 coupled to an output of saturation level circuit 78, and a switch terminal 107. Summation circuit 84 couples to D/A converter 77 via a bus 109 and couples to multiplier 76 via a bus 108 and includes a first input coupled to switch terminal 107 and a second input coupled to the output of up/down counter 69.

Switch 74 includes a terminal 111 coupled to an output of burst chroma generator 73, a terminal 112 coupled to input 61, and a switch terminal 113. Multiplier 76 is coupled to D/A converter 77 via a bus 114 and includes an input coupled to switch terminal 113. D/A converter 77 includes an input coupled to the output of digital phase shifter 72 and an output. Summation circuit 88 includes a first input coupled to the output of D/A converter 77, a second input coupled to the output of D/A converter 87 and includes an output coupled to output 62.

Switch positions of switches 74, 81, and 83 are controlled by a first control signal applied to input 50. The connection to the switches are indicated by dashed lines. The switch position of switch 52 is controlled by a second control signal applied to input 55. The connection to switch 52 is indicated by dashed lines.

Operation of feedback matching circuit 51 is described hereinafter. A primary video signal is applied to input 54. A secondary video signal to be inserted with the primary video signal comprises a luma signal and a chroma signal. The luma signal is applied to input 59. The chroma signal is applied to input 61. In the preferred embodiment, the luma and chroma signals are in a digital format. The chroma signal has two components R-Y and B-Y which are interleaved to form the chroma signal.

The chroma and luma signals are normalized to the signals generated by blanking level reference generator 79, reference saturation level circuit 82, and burst chroma generator 73. An alternate embodiment would include measuring the phase, amplitude, and blanking level of a reference signal of the secondary video signal and storing the results. The inserted secondary video signal forms a picture in picture (PIP) image with the primary video signal. The insertion occurs during the portion of a line where the PIP image is to be located. The primary and secondary video signals are combined at output 53. The combined signal at output 53 comprises a primary video portion and a secondary video portion.

The phase, amplitude, and blanking level of a reference signal of the secondary video portion is adjusted to match relative to the phase, amplitude, and blanking level of a reference signal of the primary video portion of the combined video signal by feedback matching circuit 51. The adjustment of the secondary video signal (comprising the luma and chroma signals) is described hereinafter.

The luma signal is adjusted or offset in summing circuit 86 and provided to D/A Converter 87. Up/down counter 71 provides a signal to summing circuit 86 that adjusts or offsets the luma signal so that the blanking level of the secondary video signal is matched to the primary video signal. D/A converter 87 converts the luma signal back to an analog format.

The chroma signal applied to multiplier 76 is adjusted in 6 decibel (dB) steps by data from summation circuit 84 via bus 108. Multiplier 76 provides the chroma signal to D/A converter 77 which is then converted to an analog signal. Fine amplitude adjustment of the chroma signal (less than 6 dB) is achieved by varying the reference voltages to D/A converter 77 by data from summation circuit 84 via bus 109. Phase adjustment of the chroma signal is achieved by varying the phase of the conversion clock to D/A Converter 77 by via a clock signal supplied by digital phase shifter 72.

The chroma signal (amplitude and phase) and luma signal are controlled in this way to match the amplitude, phase, and blanking level of the reference signal of the secondary video portion to the reference signal of the primary video portion. The analog luma and chroma signals at the outputs of the D/A Converters 87 and 77 are combined in summing circuit 88 to provide the secondary video signal adjusted for insertion in the primary video signal. The secondary video signal is coupled to terminal 57 of switch 52. The combined video signal is coupled from switch terminal 58 to output 53.

Operation of feedback matching circuit 51 is best described in three modes of operation. In the first mode of operation the second control signal is applied to switch 52 causing terminal 56 to be coupled to switch terminal 58. In fact, this switch configuration occurs for the majority of the video field since the primary video portion typically forms most of the video image. The primary video signal is coupled to terminal 56 and switch terminal 58. Thus, in the first mode, the primary video portion of the combined video signal is provided at output 53. The primary video portion of the combined video signal is fed back to low pass filter 63. Low pass filter 63 has a cutoff point above 3.58 MHz and has little effect on the combined video signal. Its purpose is to eliminate the 3rd order and higher harmonics of a 3.58 MHz signal. This is necessary for the measurement of a reference signal of the secondary video portion and is described hereinafter. Both the primary and secondary video portions are coupled to low pass filter 63 to keep the measurement channel gain and phase characteristics the same for the reference signal of the primary video signal and the reference signal of the secondary video signal.

Measurement of the primary video portion amplitude, phase, and blanking level is made during one or more of the backporch times during the first mode of operation. The primary video portion is converted to a digital format with A/D Converter 64. In the preferred embodiment, the reference voltages for A/D converter 64 are adjusted to convert only the reference signal of the primary video portion but does not cover the entire voltage range of the primary video portion. This increases the resolution of measurements on the primary video portion. Digital filter 66 filters and processes the reference signal of the primary video portion to separate the luma and the chroma signals thereof. An average luma signal value during the backporch time provides the blanking level for the primary video portion. The blanking level value is stored for later use. The peak amplitude of the reference signal of the primary video portion is also measured and stored for future use. The peak amplitude is found by adjusting the phase of the clock signal provided by burst locked PLL clock generator to A/D converter 64 until alternate samples are zero. In the preferred embodiment, the frequency of the clock signal is four times the reference signal frequency. The higher of the in between samples from the A/D converter are now at the peak of the reference signal.

In the second mode of operation, the first and second control signals applied respectively to inputs 50 and 55 generate the following switch configurations. Switch 81 has terminal 99 coupled to switch terminal 102 thereby coupling a blanking level reference signal to summation circuit 86. Switch 83 has terminal 104 coupled to switch terminal 107 thereby coupling a reference saturation level signal to summation circuit 84. Switch 74 has a terminal 111 coupled to switch terminal 113 thereby coupling a reference chroma signal to multiplier 76. Switch 52 has terminal 57 coupled to switch terminal 58 thereby coupling the reference signal of the secondary video signal to output 53.

In the second mode of operation, a pseudo reference signal is formed at summing circuit output 62 in place of the secondary signal. The pseudo reference is the reference signal for the secondary signal. Blanking level reference generator 79, reference saturation level circuit 82, and burst chroma generator 73 are used in forming the pseudo reference signal.

Blanking level reference generator 79 provides a blanking reference to summing circuit 86. In the preferred embodiment, this blanking reference is a fixed value and the luma at input 59 has been normalized to the same value. In other embodiments, the luma at input 59 is normalized to a time-varying reference value. In these embodiments, blanking level reference generator 79 has a copy of the normalizing value for the luma at input 59 and this time-varying blanking reference is used to generate the reference for summing circuit 86. In the third mode of operation, up/down counter 71 provides the offset correction for the luma signal at input 59. In the second mode of operation, up/down counter 71 provides the same offset correction to the blanking level reference. Since the luma signal at input 59 and blanking reference generator 79 use the same normalizing value, receive the same correction from up/down counter 71, and pass through the same circuitry beginning at switch 81 through to output 62, the blanking level reference generator 79 provides an accurate blanking level for the pseudo reference that is formed at output 62 as the reference signal for the secondary channel.

In an analogous way, reference saturation level circuit 82, provides a saturation reference to summing circuit 84. The value of the reference is the same as the value used in normalizing the chroma at input 61. In the preferred embodiment, this normalizing value is fixed. In other embodiments, the normalizing value varies over time. In these embodiments, reference saturation level circuit 82 uses the same time-varying value to produce the saturation reference to summing circuit 84. Burst chroma generator 73 supplies the 3.58 MHz modulation for the burst portion of the pseudo reference signal. In the third mode of operation, up/down counter 69 provides gain correction for the chroma signal at input 61. In the second mode of operation, up/down counter 69 provides the same gain correction to the burst chroma reference. In the third mode of operation, digital phase shifter 72 provides phase correction for the chroma signal at input 61. In the second mode of operation, digital phase shifter 72 provides the same phase correction to the burst chroma reference. Since the chroma signal at input 61 and the burst chroma reference 73 use the same normalizing value, receive the same gain and phase corrections from up/down counter 69 and digital phase shifter 72 respectively, and pass through the same circuitry beginning at switch 74 through to output 62, the burst chroma generator 73 provides an accurate chroma burst for the pseudo reference that is formed at output 62 as the reference signal for the secondary channel.

The secondary video pseudo reference formed at output 62 is coupled to output 53 through switch 52 as described above. The pseudo reference is fed back from output 53 to low pass filter 63. Similar to the first mode of operation, the phase, amplitude, and blanking level of the pseudo reference signal of the secondary video portion are measured from output 53. It is important to note that the measurement occurs from the same point where the reference signal of the primary video portion is measured (first mode of operation) and through the same measurement channel. The measurements made on the pseudo reference signal for the secondary video portion are compared to the measurements made in the first mode of operation on the reference signal for the primary video portion. Any difference in phase, amplitude, or blanking level between the two reference signals generates a corresponding adjustment from control circuit 68 to reduce the difference. The up/down counters 69 and 71 and the digital phase shifter 72 responds to signals from control circuit 68 to adjust multiplier 76. D/A converter 77, and summation circuits 84 and 86 (as described above). These new adjustments are maintained in the third mode of operation to match the secondary video signal relative to the primary video signal.

In the third mode of operation, the first and second control signals applied respectively to inputs 50 and 55 generate the following switch configurations. Switch 81 has terminal 101 coupled to switch terminal 102 thereby coupling the luma signal of the secondary video signal to summation circuit 86. Switch 83 has terminal 106 coupled to switch terminal 107 thereby coupling a saturation level signal to summation circuit 84. In the preferred embodiment, the saturation level signal is a user or external control signal. Switch 74 has terminal 112 coupled to switch terminal 113 thereby coupling the chroma signal of the secondary video signal to multiplier 76. Switch 52 remains in the position recited in the second mode of operation, wherein terminal 57 is coupled to switch terminal 58.

In the second mode of operation, adjustments are made in circuitry of feedback matching circuit 51 to reduce differences in phase, amplitude, and blanking level between the reference signals corresponding to the secondary video signal applied to inputs 59 and 61 and the primary signal applied to input 54. In the third mode of operation the luma and chroma signals of the secondary video signal are coupled through feedback matching circuit 51. The corrections made in the second mode of operation are applied to the luma and chroma signals. The secondary video signal with the new adjustments is coupled to output 62. Correcting the secondary video signal to match relative to the reference signal of the primary video portion is done continuously once per field. Switch 52 toggles between terminals 56 and 57 (first and third modes of operation) during each line where the secondary video signal is inserted into the primary video signal.

By now it should be appreciated that a feedback matching circuit is provided that automatically reduces differences in phase, amplitude, and blanking level of a secondary video signal to be inserted within a primary video signal.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A method for matching a secondary video signal to a primary video signal, the secondary video signal being inserted with the primary video signal forming a combined video signal, the combined video signal includes a primary video portion and a secondary video portion, the method comprising:
   feeding back the combined video signal to a feedback matching circuit for measuring a phase, amplitude, and blanking level of a reference signal of the primary video portion and measuring a phase, amplitude, and blanking level of a reference signal of the secondary video portion;
   comparing a measurement of said phase, amplitude, and blanking level of said reference signal of the primary video portion to a measurement of said phase, amplitude, and blanking level of said reference signal of the secondary video portion of the combined video signal; and
   adjusting the secondary video signal to match said phase, amplitude, and blanking level of said reference signal of the primary video portion.

2. A method as recited in claim 1 further including a step of storing a phase, amplitude, and blanking level of said reference signal of the secondary video signal.

3. A method as recited in claim 1 further including a step of converting an alternate video signal from an analog format to a digital format for forming the secondary video signal 4. A method as recited in claim 3 wherein said step of converting said alternate video signal to a digital format includes a step of compressing said alternate video signal.

5. A method as recited in claim 4 wherein said step of compressing said alternate video signal includes a step of splitting said alternate video signal into a chroma signal and a luma signal and a step of storing said chroma signal and said luma signal in memory wherein said stored chroma and luma signals form the secondary video signal.

6. A method as recited in claim 1 wherein said step of feeding back a combined video signal includes:
   filtering said combined video signal with a low pass filter;
   converting the combined video signal from an analog format to a digital format; and
   filtering the combined video signal for separating luma and chroma signals thereof.

7. A method as recited in claim 6 wherein said step of adjusting the secondary video signal includes:
   incrementally adjusting said chroma signal to reduce a phase difference between said phase of said reference signal of the secondary video portion and said phase of said reference signal of the primary video portion;
   incrementally adjusting said chroma signal to reduce an amplitude difference between said amplitude of said reference signal of the secondary video portion and said amplitude of said reference signal of said primary video portion; and
   incrementally adjusting the luma signal to reduce a blanking level difference between said blanking level of said reference signal of the secondary video portion and said blanking level of said reference signal of said primary video portion.

8. A method as recited in claim 7 further including:
   converting said chroma signal to an analog format;
   converting said luma signal to an analog format; and
   summing said chroma and luma signals together thereby forming the secondary video signal.

9. A method as recited in claim 8 further including:
   inserting the secondary video signal in the primary video signal thereby forming the combined video signal.

10. A feedback matching circuit for matching a secondary video signal to a primary video signal, the secondary video signal being inserted into the primary video signal forming a combined video signal having a primary video portion and a secondary video portion, the feedback matching circuit comprising:
    an A/D (analog to digital) converter responsive to the combined video signal;
    a digital filter responsive to said A/D converter for separating luma and chroma signals of a reference signal of the primary video portion and of a reference signal of the secondary video portion;
    a control circuit responsive to said digital filter for comparing said phase, amplitude, and blanking level of said reference signals of the primary and secondary video portions.

11. A feedback matching circuit as recited in claim 10 further including:
    a digital phase shifter responsive to said control circuit for adjusting a reference signal of the secondary video signal to reduce a phase difference between said reference signals of the primary and secondary video portions; and
    a burst locked PLL clock generator responsive to said digital filter for clocking said A/D converter, digital phase shifter, and digital filter.

12. A feedback matching circuit as recited in claim 11 further including:

a burst chroma generator for providing a reference burst chroma signal; and a first switch responsive to a first control signal for switching between said reference burst chroma signal and a chroma signal of the secondary video signal.

13. A feedback matching circuit as recited in claim 12 further including:

a reference saturation level circuit for providing a reference saturation control signal;

a saturation level circuit for providing a saturation control signal;

a second switch responsive to said first control signal for switching between said reference saturation control signal and said saturation control signal;

a first summing circuit responsive to said second switch and said control circuit for summing signals applied thereto;

a multiplier responsive to said first switch and said first summing circuit; and a first D/A converter responsive to said first summing circuit, said digital phase shifter, and said multiplier for providing said chroma signal that is adjusted in phase and amplitude and converted to an analog format.

14. A feedback matching circuit as recited in claim 13 further including:

a blanking level reference generator for providing a blanking level reference signal;

a third switch responsive to said first control signal for switching between said blanking level reference signal and a luma signal of the secondary video signal;

a second summing circuit responsive to said third switch and said control circuit for summing signals applied thereto;

a second D/A converter responsive to said second summing circuit for providing said luma signal that is adjusted in level and converted to an analog format.

15. A feedback matching circuit as recited in claim 14 further including:

a third summing circuit responsive to said first D/A converter and said second D/A converter for providing the secondary video signal that is phase, amplitude, and blanking level matched relative to said phase, amplitude, and blanking level of said reference signal of the primary video portion; and a fourth switch responsive to a second control signal for switching between the secondary video signal and a primary video signal being supplied thereto, said fourth switch providing the combined video signal.

16. A feedback matching circuit as recited in claim 15 further including:

a first up/down counter coupled between said control circuit and said first summing circuit for providing incremental adjustment of said chroma signal thereby reducing a difference between said amplitude of said reference signal of the secondary video portion and said amplitude of said reference signal of said primary video portion; and a second up/down counter coupled between said control circuit and said second summing circuit for providing incremental level adjustment of said luma signal thereby reducing a difference between said blanking level of said reference signal of the secondary video portion and said blanking level of said reference signal of said primary video portion.

17. A circuit for providing a secondary video signal matched relative to a primary video signal wherein the primary and secondary video signal are combined forming a combined video signal, comprising:

an A/D (analog to digital) converter responsive to an alternate video signal for converting said alternate video signal to a digital format;

a video DSP (digital signal processor) responsive to said A/D converter for processing said alternate video signal applied thereto and for providing the secondary video signal;

a RAM for storing data;

a RAM interface responsive to said video DSP and a control signal for interfacing said RAM to said video DSP;

a feedback matching circuit responsive to a primary video portion and a secondary video portion of the combined video signal and said RAM interface for adjusting the secondary video signal to match relative to a phase, amplitude, and blanking level of a reference signal of said primary video portion; and a D/A (digital to analog) converter responsive to said feedback matching circuit for converting the secondary video signal from said digital format to an analog format.

18. The circuit as recited in claim 17 further including:

a control circuit for providing said control signal; and a switch responsive to said control signal for switching between the primary video signal and the secondary video, the switch providing the combined video signal.

* * * * *

UNITED STATES PATENT AND TRADEMARK OFFICE
CERTIFICATE OF CORRECTION

PATENT NO. : 5,396,296
DATED : March 7, 1995
INVENTOR(S) : Mary E. Gallagher et al It is certified that error appears in the above-indentified patent and that said Letters Patent is hereby corrected as shown below:

On the title page, inventor should read

--(75) Inventor: Mary E. Gallagher, Mesa, Az;
              David A. Hostetler, Rolling Hills, E. CA--.

Signed and Sealed this

First Day of August, 1995

*Attest:*

BRUCE LEHMAN

*Attesting Officer*     *Commissioner of Patents and Trademarks*